(12) United States Patent
Oliver et al.

(10) Patent No.: US 9,138,836 B2
(45) Date of Patent: Sep. 22, 2015

(54) METHOD OF PROTECTION IN TOWER

(71) Applicants: Edward Antony Oliver, Dana Point, CA (US); William Nichols, Zephyr Cove, CA (US)

(72) Inventors: Edward Antony Oliver, Dana Point, CA (US); William Nichols, Zephyr Cove, CA (US)

(*) Notice: Subject to any disclaimer, the term of this patent is extended or adjusted under 35 U.S.C. 154(b) by 0 days.

(21) Appl. No.: 14/532,976

(22) Filed: Nov. 4, 2014

(65) Prior Publication Data

US 2015/0052734 A1 Feb. 26, 2015

Related U.S. Application Data

(62) Division of application No. 13/175,806, filed on Jul. 1, 2011, now Pat. No. 8,899,539.

(60) Provisional application No. 61/361,513, filed on Jul. 5, 2010.

(51) Int. Cl.
*A47B 96/06* (2006.01)
*B23P 11/00* (2006.01)
*F03D 11/00* (2006.01)

(52) U.S. Cl.
CPC ............... *B23P 11/00* (2013.01); *F03D 11/00* (2013.01); *Y02E 10/722* (2013.01); *Y10T 29/49959* (2015.01); *Y10T 428/24008* (2015.01)

(58) Field of Classification Search
USPC ........................................ 248/229.1, 643, 540
See application file for complete search history.

(56) References Cited

U.S. PATENT DOCUMENTS

| | | | | | |
|---|---|---|---|---|---|
| 4,706,426 | A | * | 11/1987 | Rumsey | 52/232 |
| 5,826,848 | A | * | 10/1998 | Cekosh | 248/345.1 |
| 6,053,471 | A | * | 4/2000 | Brown | 248/642 |

* cited by examiner

*Primary Examiner* — Kristina Junge
(74) *Attorney, Agent, or Firm* — George P. White

(57) ABSTRACT

A method for using a guard for structural members is disclosed. This can reduce worker injury with a thin sheet metal or plastic, broadly U-shaped guard plate attached to a structural support through attachment to a pair of clamps, each with a primary and a secondary threaded clamp mechanism. The attachment between the guard plate and pair of clamps may be via a slotted intermediate structure. The primary mechanism has a swivel pad end while the secondary clamps have a pointed, cone-shaped end. The guard can be used in wind turbine towers to protect workers on a fixed ladder from hitting interior flanges as they climb up and as they climb down.

7 Claims, 6 Drawing Sheets

METHOD OF PROTECTION IN TOWER

RELATED APPLICATIONS

This application is a divisional application of U.S. utility application Ser. No. 13/175,806 filed Jul. 1, 2011, which in turn claims priority from provisional application 61/361,513 filed Jul. 5, 2010, both of which are hereby incorporated herein by reference in their entirety.

FIELD

This disclosure describes methods related to device attachable to a fixed structure for the purpose of protecting personnel working in tight spaces from head and other types of injury.

BACKGROUND

Utility spaces in fixed structures may have a variety of hazards not present in areas designed for general occupancy. However, even in hard-hat areas covered with warning signs it is still prudent to provide for worker protection from hazards such as low beams. Modification of structural members however is generally to be avoided. It can also be important to allow ready visual inspection of such members.

SUMMARY

An angled, flat guard attached to the member via adjustable clamps can solve the problem of bodily protection in areas requiring blind movement relative to structural members. This can be applied to an inside flange in a cylindrical tower with a fixed ladder, as one example application.

DETAILED DESCRIPTION

Figure 1:
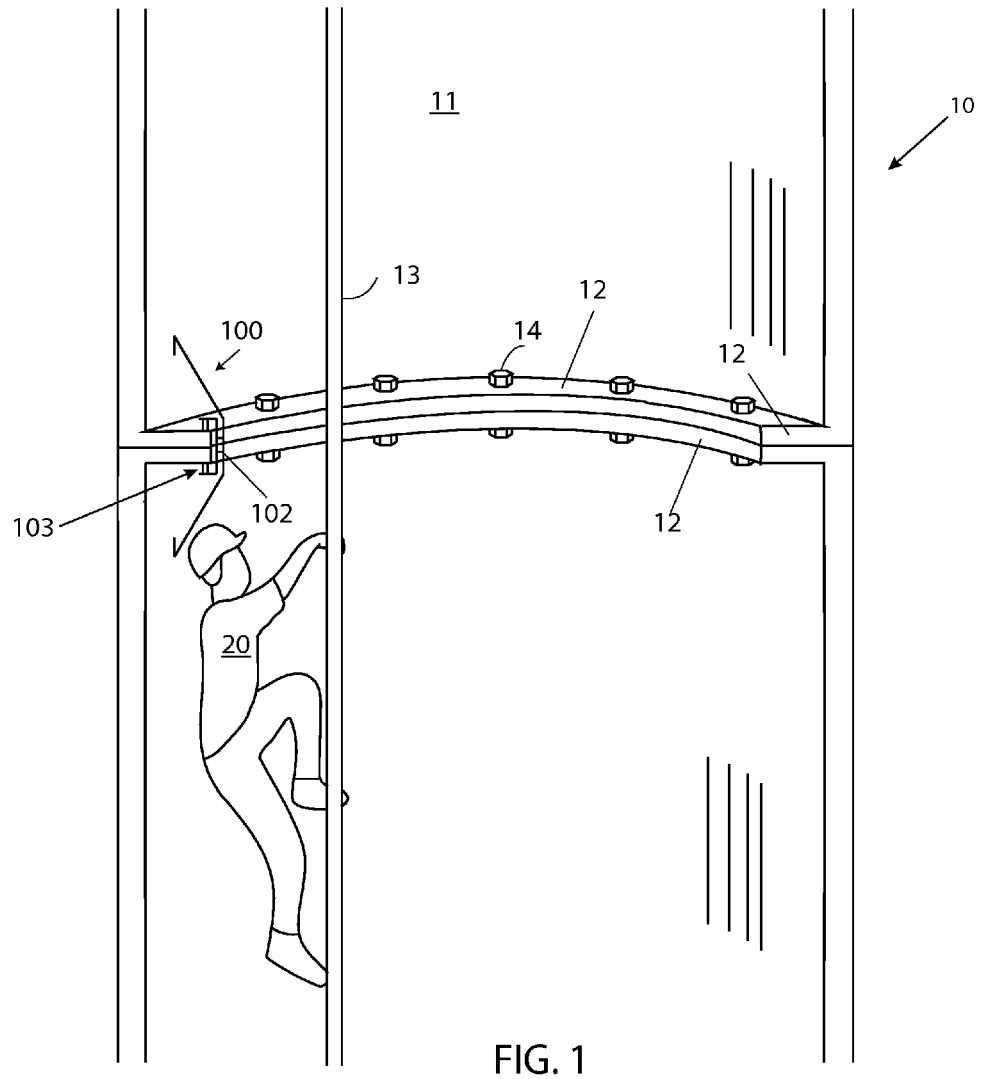
FIG. 1 shows a cut-away side view of a worker climbing a ladder in a tower and approaching a protected flange.

The first embodiment presented is an apparatus for use in a wind turbine tower. FIG. 1 shows a schematic side view of a portion of a tower. The tower 10 is constructed of multiple generally cylindrical hollow tubes connected by inside flanges. In FIG. 1 the tower walls 11 and flanges 12 of two adjoining sections are shown in cross section. The flanges are shown connected by bolts 14. A fixed ladder 13 is used by a worker 20 to get to the top of the tower. The ladder is often close to the inner wall of the tower. If the distance from the flange to the ladder is less than about three feet it can present a hazard to workers climbing the ladder. When climbing upward they are facing away from a protrusion that can be almost directly over their head. Whether climbing up or down, the use of "climb assists" can increase the danger to the workers due to the increased speed at which the worker is moving.

In this embodiment a guard apparatus 100 is used to address this safety issue. The worker's head is deflected away from the hazard above by a sheet metal guard plate 101 at a 60-degree angle from the horizontal axis to the wall. The guard plate 101 shown in FIG. 3 has three regions, including a base region 302 parallel to the major plane of the guard mount 300 and a lower angled sheet metal region 303 at acute angle to the base region. Although possibly not as dangerous, a similar hazard is present as the worker descends. Therefore, the embodiment shown has a symmetric design with a second sheet metal region 301 positioned above the mating of the two flanges. Since the flanges are structural support members they and their mutual connection should preferably not be modified or interfered with in coupling a guard to the structure. In FIG. 1 a pair of clamp assemblies 103 holds mounting bars 102 to the mated flanges. The guard itself 101 is bolted to the mounting bars.

The guard plate in this embodiment can be made of sheet metal or of plastic. As mentioned, the upper region provides an analogous protection for a descending worker. Without this guard a worker might injure their back or their coccyx. Additionally, without this guard a worker's personal fall protection equipment can also become hung up or snagged on the exposed flange bolts and/or nuts, possibly damaging their personal fall protection equipment and/or injuring the worker.

Figure 2:
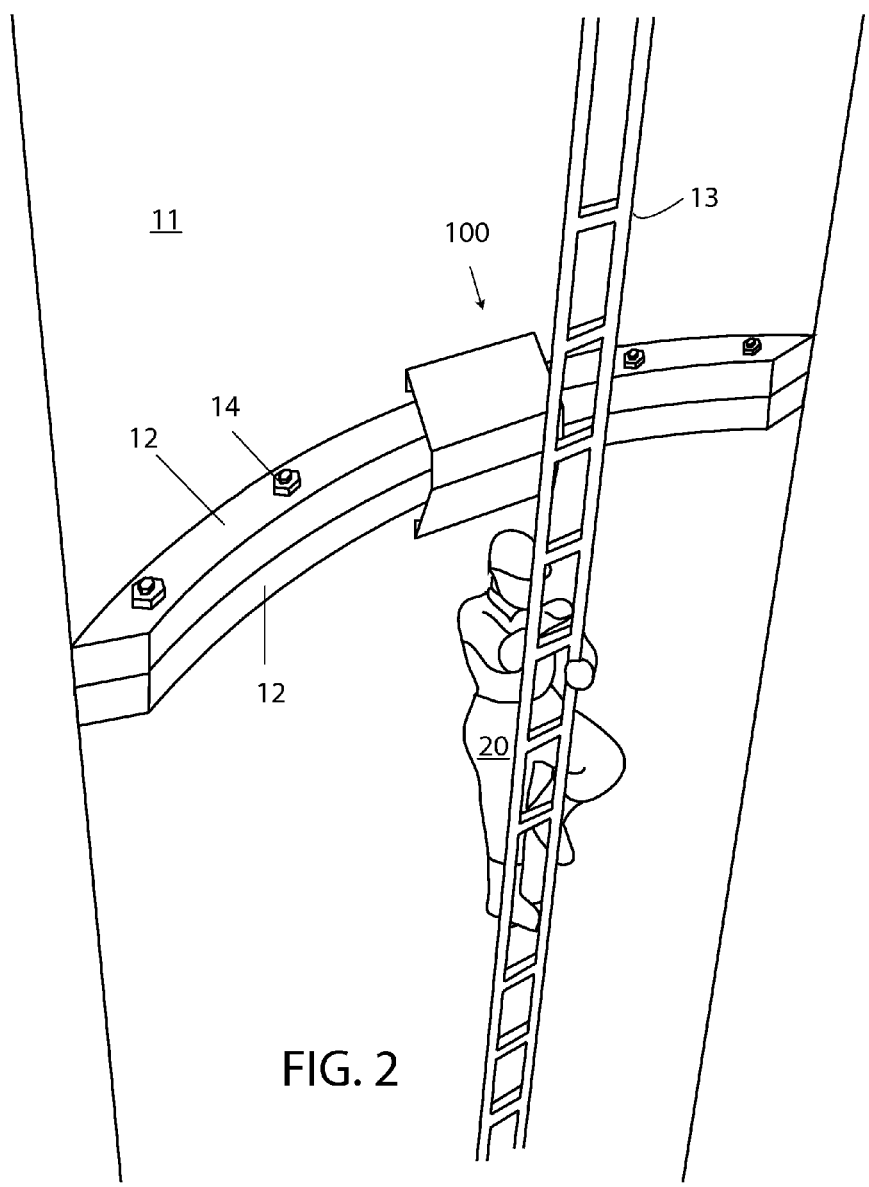
FIG. 2 shows a perspective view of a worker climbing a ladder in a tower.

FIG. 2 shows the scenario of FIG. 1 from a different perspective.

Figure 3:
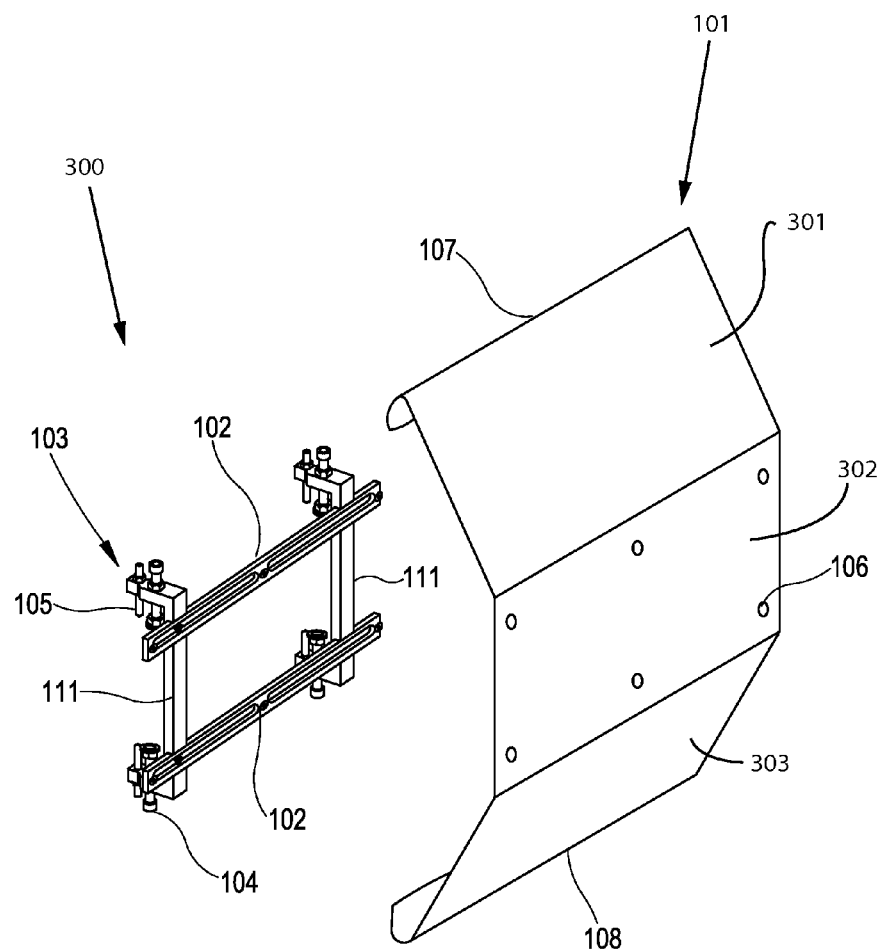
FIG. 3 shows an expanded perspective view of the guard of FIG. 1.
Figure 4:
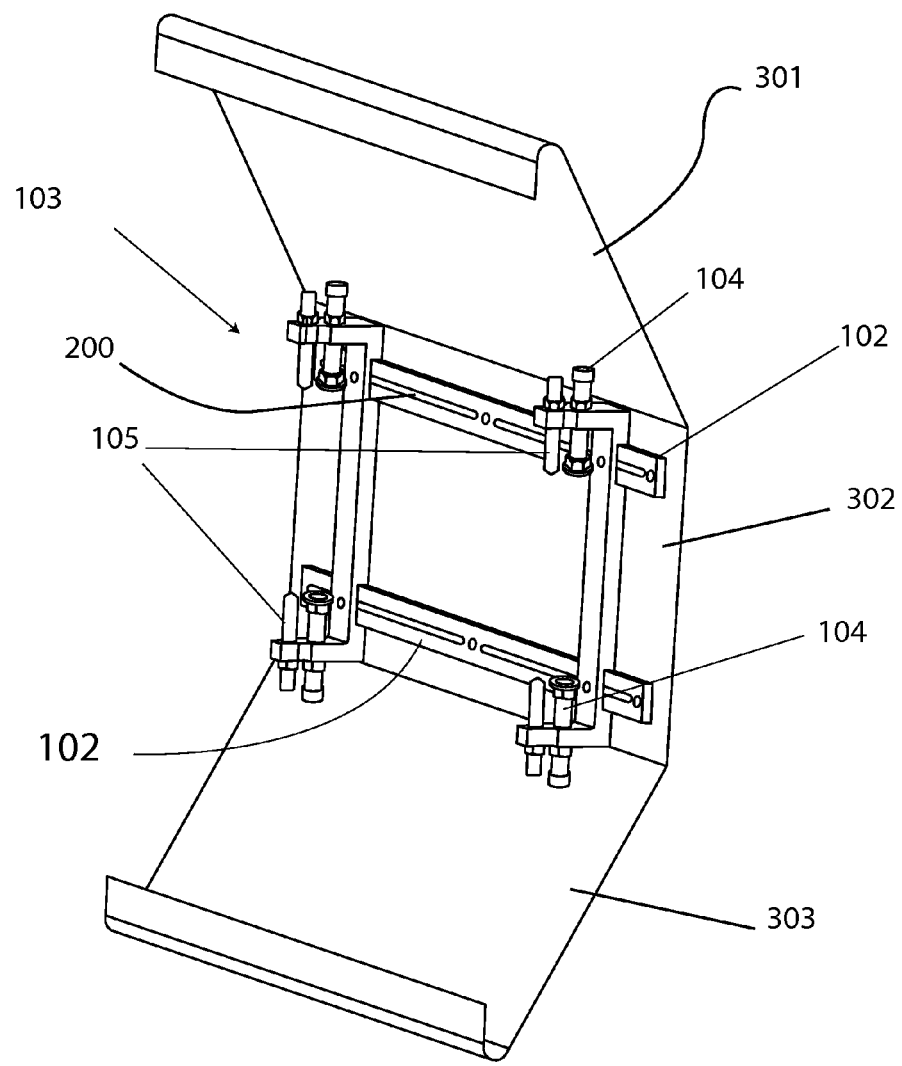
FIG. 4 is a perspective view of the unit of FIG. 3 from the back.

FIG. 3 shows an expanded, exploded, perspective view of this first embodiment of a head guard apparatus 100. There are two clamp assemblies 103, a left and a right unit. The clamp assemblies each connect to both an upper and a lower mounting bar 102. The mounting bars shown in this figure each have a left and a right slot 200 running in the direction of the major axis of the bars. The slots, together, take up substantially all of the length of each bar other than a small region in the center of the bar. Each clamp assembly has a U shaped bar 111 supporting two pairs of threaded screws 104 105 for attaching the whole apparatus to a pair of mated flanges. The two clamp assemblies connected to the two mating bars, as seen on the left side of FIG. 3, are collectively the guard mount 300. FIG. 4 shows the example embodiment from the back with the guard plate secured to the mounting bars. The guard plate itself 101 is secured to the upper and lower mounting bars via bolts 15 through six holes 106 in its central portion. As seen in FIGS. 3 and 4, bolts between the clamps and mounting bar engage the mounting bars' slots. This inherently provides a maximal degree of horizontal positioning of the guard relative to the clamps' locations. Additionally, it therefore provides horizontal positionability between the shield and the particular locations on the flange at which the clamps may be attached at any particular time.

Figure 5:
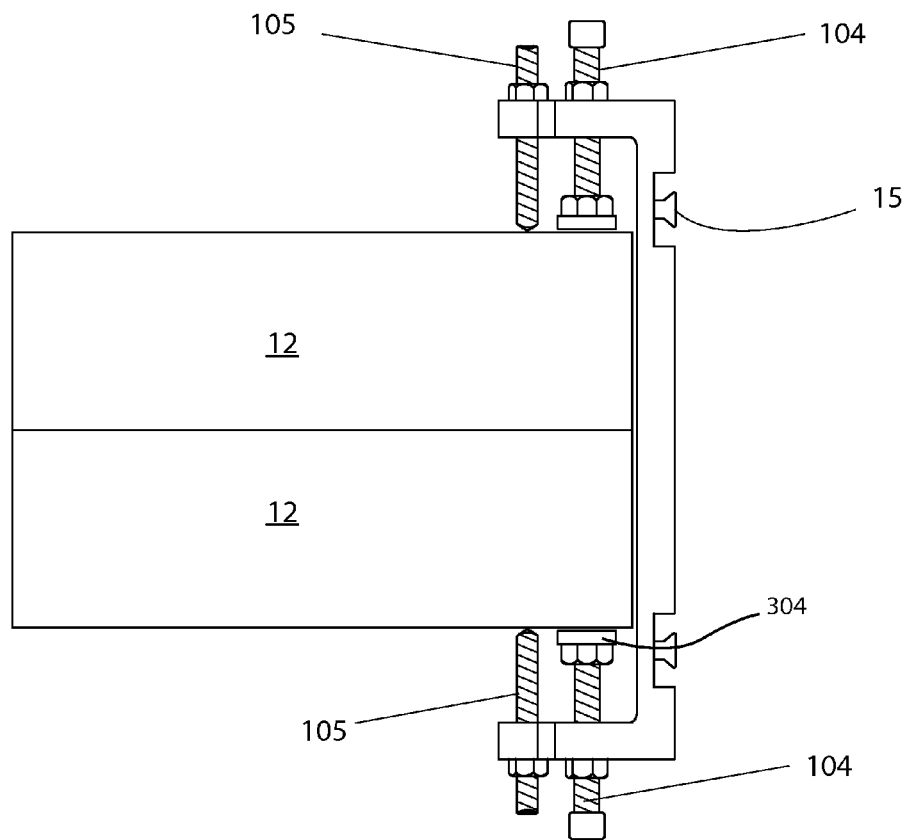
FIG. 5 shows one clamp of the unit of FIG. 3, in isolation, in a side view in a position clamped to the meeting of two flanges.
Figure 6:
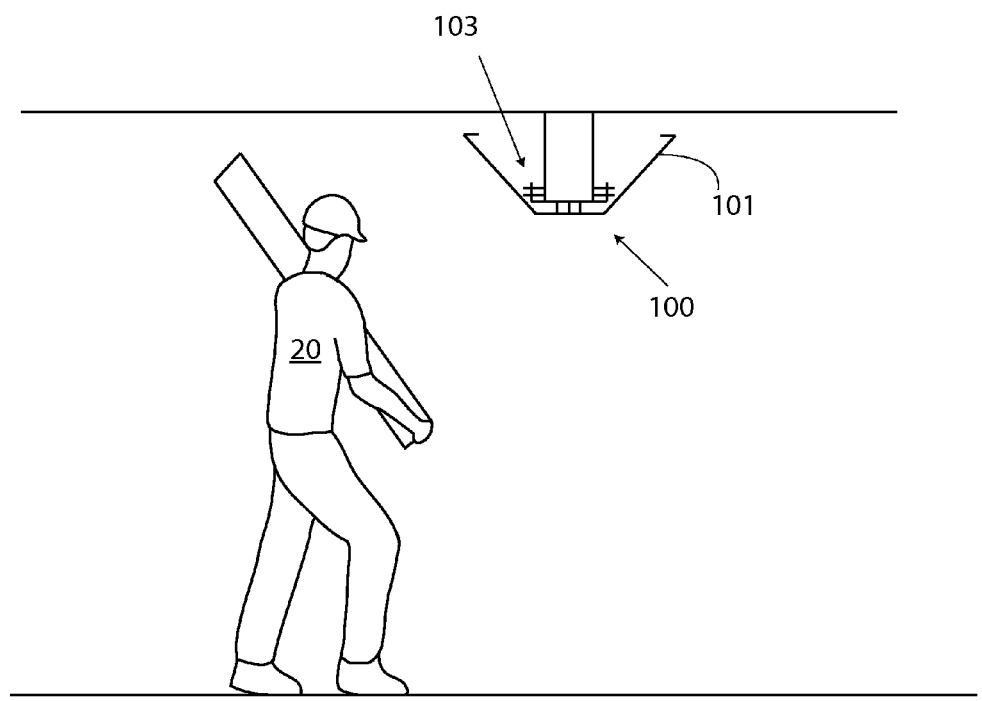
FIG. 6 shows a second embodiment in a hallway.

The clamping is shown in detail in FIG. 5, an expanded view of one of the clamps attached to a pair of flanges. One set of threaded screws 104 is the primary clamping mechanism to attach the guard to the flanges. They are opposing screws with swivel pad feet 304 and locking nuts. The second set of screws 105 are for a secondary clamping for enhanced stability and a "back-up" clamping. A second version for horizontal movement is shown in FIG. 6 and described below in Operations.

Operation

The guard system is installed by first adjusting the two types of threaded clamp screws a primary 104 and a secondary 105 to center the mounting bars relative to the flange. The left and right primary screws 104 are then tightened to a specified torque rating. This is to be adequately secure without harming the flanges in any way—not even cracking any paint. The locking nuts are then tightened to their specified torque. The secondary, pointed screws 105 are then tightened to their specifications.

After inspection of the clamps, as seen in the various drawings, the mounting bars can be secured to the clamps via the mounting bar slots. As is inherent in a slotted structure, a relative horizontal relationship between clamps and the bars can be determined as suitable for the specific installation and established by tightening of the bolts. Then the guard plate is secured to the upper and lower mounting bars 102 with screws through the six holes 106. The lower edge 108 and the upper edge 107 of the guard plate are proximate to the inner wall. When installed, the guard provides a surface with an acute angle relative to the motion of the worker's head as he climbs the ladder. The worker's head is therefore deflected away from the obstruction and toward the ladder by the slope of the guard. Analogously, the workers backside is urged toward the ladder when descending past this point.

For inspection of, or other access to, the flange bolts, the screws holding the guard plate to the mounting bars are removed and full access to the flange is obtained.

A second example is seen in FIG. 6. A worker 20 is shown walking towards a low beam cutting across his path. An elongated version of a guard plate is seen secured to the beam by a clamping assembly 103. If the worker doesn't notice the beam, his hardhat will be pushed downward by the guard plate 101.

Those skilled in the art will be aware of materials, techniques and equipment suitable to produce the example embodiments presented as well as variations on those examples. This teaching is presented for purposes of illustration and description but is not intended to be exhaustive or limiting to the forms disclosed. Many modifications and variations will be apparent to those of ordinary skill in the art. The embodiments and versions help to explain the principles of the invention, the practical application, and to enable others of ordinary skill in the art to understand it. Various embodiments with various modifications as are suited to the particular application contemplated are expected.

In the following claims, the words "a" and "an" should be taken to mean "at least one" in all cases, even if the wording "at least one" appears in one or more claims explicitly. The scope of the invention is set out in the claims below.

The invention claimed is:

1. A method of protection from injury comprising:
attaching at least two clamp assemblies to a structural member of a fixed structure; where the clamp assemblies each have a primary clamping mechanism and a distinct secondary clamping mechanism where the primary clamping mechanism and the secondary clamping mechanism each, respectively, comprise a pair of opposed, axially aligned, threaded screws with paired, respective clamping surfaces facing one another;
tightening the primary clamping mechanism and secondary clamping mechanism of the at least two clamp assemblies, thereby securing them to the structural member;
coupling, operationally, at least two clamp assemblies to a first flat region of a guard plate, the coupling adapted to fix the first flat region parallel to the axially aligned screws and to a straight line drawn through the at least two clamps, and where a second flat region of the guard plate depends from one edge of the first flat region at an obtuse angle as measured on a side of the guard plate opposite a side facing the clamps.

2. The method of claim 1 where the guard plate further comprises a third flat region depending from an opposing side of the first flat region at an obtuse angle.

3. The method of claim 1 where the structural member comprises conjoined interior flanges of a hollow tower.

4. A method of protection from injury comprising:
attaching at least two clamp assemblies to a structural member of a fixed structure; where the clamp assemblies each have a primary clamping mechanism and a distinct secondary clamping mechanism where the primary clamping mechanism comprises a pair of opposed, axially aligned, threaded screws with paired, respective clamping surfaces facing one another;
tightening the primary clamping mechanism and secondary clamping mechanism of the at least two clamp assemblies, thereby securing them to the structural member;
coupling, operationally, at least two clamp assemblies to a first flat region of a guard plate, the coupling adapted to fix the first flat region parallel to the axially aligned screws and to a straight line drawn through the at least two clamps, and where a second flat region of the guard plate depends from one edge of the first flat region at an obtuse angle as measured on a side of the guard plate opposite a side facing the clamps.

5. The method of claim 4 where the guard plate further comprises a third flat region depending from an opposing side of the first flat region at an obtuse angle.

6. The method of claim 4 where the structural member comprises conjoined interior flanges of a hollow tower.

7. A method of protection from injury comprising:
attaching at least two clamp assemblies to a structural member of a fixed structure; where the clamp assemblies each have a primary clamping mechanism and a distinct secondary clamping mechanism where the primary clamping mechanism and the secondary clamping mechanism each, respectively, comprise a pair of opposed, axially aligned, threaded screws with paired, respective clamping surfaces facing one another;
tightening the primary clamping mechanism and secondary clamping mechanism of the at least two clamp assemblies, thereby securing them to the structural member;
coupling, operationally, at least two clamp assemblies to a guard plate, the coupling and guard plate adapted to fix a generally flat region at an obtuse angle with respect to a plane defined by the axially threaded screws of the first clamp assembly, the obtuse angle facing away from the clamp assemblies.

\* \* \* \* \*